United States Patent [19]
Friese et al.

[11] 3,909,459
[45] Sept. 30, 1975

[54] COMPOSITION RESISTOR SUITABLE FOR SPARK PLUGS AND METHOD OF MAKING THE SAME

[75] Inventors: Karl-Hermann Friese; Heinz Geier, both of Leonberg, Germany

[73] Assignee: Robert Bosch G.m.b.H., Stuttgart, Germany

[22] Filed: Sept. 6, 1973

[21] Appl. No.: 394,678

[30] Foreign Application Priority Data
Sept. 15, 1972 Germany............................ 2245404

[52] U.S. Cl. .................. 252/509; 106/46; 252/506; 252/507
[51] Int. Cl.²........................................... H01B 1/06
[58] Field of Search ....... 252/507, 509, 506; 106/46

[56] References Cited
UNITED STATES PATENTS
3,538,021  11/1970  Achey................................. 252/506

Primary Examiner—Benjamin R. Padgett
Assistant Examiner—E. Suzanne Parr
Attorney, Agent, or Firm—William R. Woodward

[57] ABSTRACT

The use of lithium borosilicate glass and lithium calcium borosilicate glass with an aggregate sodium oxide and potassium oxide content as low as possible and in any event not greater than 2% by wt. makes possible the production of fused composition resistors composed of glass, carbon black and an inorganic filler having high stability of electrical characteristics during operation in spark plug service which are capable of being fused in manufacture at temperatures of the order of 830°C. Still lower temperature fusion can be obtained with addition of lead oxide at some sacrifice of electrical qualities. Strontium or barium may replace some of the calcium and the glass may also use some magnesium or aluminum oxide. A part of the glass is ground to finer particles in a pregrinding step together with zirconium dioxide as an inorganic filler and the carbon black and the fine material thus obtained is applied to the somewhat coarser glass particles by mixing with an aqueous solution or emulsion of an organic binder. Another preparation is to mix the materials with a binder into a pasty mass and then to granulate the material.

5 Claims, 1 Drawing Figure

U.S. Patent    Sept. 30,1975    3,909,459
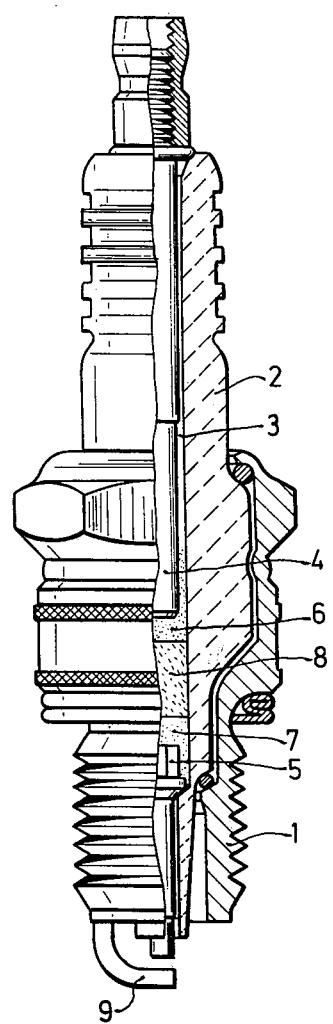

COMPOSITION RESISTOR SUITABLE FOR SPARK PLUGS AND METHOD OF MAKING THE SAME

The invention relates to composition resistors, particularly for spark plugs, consisting essentially of glass and carbon black, with or without inorganic fillers, and methods of making the same.

Composition resistors are built into spark plugs in order to suppress radio interference. The built-in resistor of a spark plug connects the lower and upper pieces of the central electrode of the spark plug and an electrically conducting sealing material may be interposed between the resistor and one or both of the electrode pieces.

Spark plugs are known to be manufactured in very large quantities, so that it is important to introduce every possible economy in their manufacture. This applies both to the materials used and to the processes by which the spark plugs are produced.

Composition resistors utilizing carbon black as resistance material are already known. In order to make such composition resistors stable against prolonged spark stress and to make their resistance value so far as possible independent of the spark voltage, barium borate glasses are used in the preparation of these carbon black base composition resistors. The resulting resistors have the disadvantage, however, that firing temperatures higher than 900°C are necessary to fuse the material in order to have adequate stability under repeated stress. Furthermore, these composition resistors have the property that their electrical resistance is not constant and gradually changes during the period of uses unless an artificial aging procedure is carried out beforehand.

This necessity of an aging process can be avoided with known composition resistors by adding to the resistor composition during manufacture an organic material that can be carbonized by heat and thereby to compensate for the resistance change of the carbon black during use. The addition of these carbonizable materials has the disadvantage, however, that here also fusion temperatures from 870° to 950°C must be used, so that these materials can in fact be changed into carbon.

In these known composition resistors relatively little notice has been accorded to the composition of the glass used, so that the choice of glass is in a large measure open, even though, as already mentioned above, it is preferred in many cases to use a barium borate glass, which requires a relatively high firing temperature. Sodium borosilicate glasses are the most widely used for this purpose.

It is an object of this invention to provide a resistor composition which can be fused at a temperature from 820° to 850°C to make a resistor of which the resistance value does not need to be subjected to an aging process after fusion. The resistance value should change only slightly under prolonged thermal stress at temperatures above 350°C. The resistance value, furthermore, should have only a small dependence on voltage. Moreover, it should be possible to connect the composition resistor without difficulty in a gas tight junction with an electrically conducting sealing material, without allowing voids and cracks to be produced in the transition zones.

SUBJECT MATTER OF THE PRESENT INVENTION

Briefly, in the composition of the resistor there is used for the glass a lithium borosilicate glass or a lithium calcium borosilicate glass, in each case a glass having a content of sodium oxide and/or potassium oxide amounting to not more than 2% by weight. The lower limit of the aggregate content of sodium oxide and/or potassium oxide is actually 0% if one disregards impurities that are always present and quantitatively measurable only with difficulty.

It has been found that, in contrast to the opinion heretofore prevailing in the industry, the composition of the glass has a decisive influence on the property of the resistor element, with reference to the change of resistance under prolonged temperature stress as well as with reference to the voltage dependence of the resistance value. Experiments with sodium borosilicate glasses that are widely used for fused inserts in spark plugs have shown that although these can indeed be fused in the desired temperature range, i.e. about 830°C, the resistance value drops irreversibly down to about 50% of the original value when subjected to spark stresses at a peak voltage of 15 kV. This resistance reduction had to be put into the process by an aging procedure and allowed for in manufacture. The aging procedure constitutes an additional time-consuming processing step. Thereafter such composition resistors suffer an appreciable increase of the resistance value under prolonged temperature stress. Finally, composition resistors using sodium borosilicate glass have a high voltage dependence of the resistance value (reduction by 60% to 70% at 14 kV peak voltage), producing an intolerably great reduction of the radio interference suppression.

In the use of lithium calcium borosilicate glass in the composition resistors of this invention at least a part of the calcium can be replaced by barium or strontium. The temperature necessary for fusion can be reduced still further by the addition of lead oxide, but a practical limit for lead oxide addition is rapidly reached, because if the lead oxide content is too high, the resistance reduction after first exposure to spark conditions is noticeably increased. It is possible to use glass with some aluminum oxide content but that must not be too high, because addition of aluminum oxide raises the necessary fusion temperature of the glass very soon to undesired levels. Additions of barium oxide or strontium oxide have similar effects. The percentage by weight of the significant constituents in the kinds of glass usable in this invention are set forth below, followed in each case by a percentage range preferred for the present invention:

| | | | |
|---|---|---|---|
| $SiO_2$ | 35 – 65, | especially | 45 – 60% by wt. |
| $B_2O_3$ | 20 – 55, | " | 30 – 45% by wt. |
| $Li_2O$ | 0.5 – 10, | " | 2.5 – 7% by wt. |
| $Na_2O + K_2O$ | ≦ 2.0, | " | ≦ 1.0% by wt. |
| CaO | 0 – 15, | " | 2 – 10% by wt. |
| SrO | 0 – 15, | " | ≦ 0.5% by wt. |
| BaO | 0 – 10, | " | ≦ 0.5% by wt. |
| MgO | 0 – 15, | " | ≦ 0.5% by wt. |
| $Al_2O_3$ | 0 – 15, | " | ≦ 1.0% by wt. |
| PbO | 0 – 5, | " | ≦ 0.5% by wt. |

In table 1 the chemical composition and some of the properties of fourteen different types of glass are tabulated. Knowledge of the thermal expansion coefficient (TEC) is important for adjusting the average expansion coefficient of the composition resistor to the surrounding ceramic material of a spark plug, a result that commonly involves the choice of a suitable filler for the purpose. The transformation temperature $t_g$ of the glass should be as high as possible, in any case clearly above the temperature to be used later for fusing the composition resistor. If the transformation temperature lies below the temperature later applied, the gas tightness of the composition resistor and the stability of the electrical resistance under temperature stress is endangered. The softening temperature $t_s$ given in the last column of Table 1 is the temperature at which a cylindrical body as viewed in a microscope under application of heat, is softened to such an extent that the height shrinks to 75% of the original height. This temperature gives a point of reference for the order of magnitude of the fusion temperature to be expected, although no direct relation between these two properties exists.

In Table 2 the glass type is given for the 14 glass compositions of Table 1 and also the necessary temperature for fusing in a composition resistor and the relative change of resistance of the resulting composition resistor under various kinds of stress. In all cases, as can be seen from Table 1, only borosilicate glass is involved, so that the various types are essentially to be distinguished by the different cations, indicated in the first column of Table 2. In the second column is the cross reference to Table 1 (the Ser. No. of the first column of Table 1), while the third column shows the aggregate sodium oxide and potassium oxide content which is so important for the glass here under consideration. In the fourth column is given the necessary fusion temperature, as determined experimentally. The last four columns indicate the relative change of resistance value under various stress conditions from which may be inferred the nature of the influence of the glass composition on these characteristic properties of the composition resistor. The symbols of the column headings of these four columns have the following meaning:

$R_o$ = initial resistance after fusion $R_1$ = resistance value after operation in spark circuit (3,000 sparks/min., 15 kV peak voltage, for 5 minutes at room temperature)

$\Delta R_1/R_o$: relative change in resistance after operation in a spark circuit ($\Delta R_1/R_o = (R_1 - R_o) / R_o$)

$\Delta R_2/R_1$: relative change in resistance from prolonged temperature stress (350°C for at least 15 hours).

$\Delta R_3/R_1$: relative change of resistance under prolonged spark stress (coil ignition, 15 kV peak voltage, 3,200 sparks/minute, at 350°C for 300 hours)

$\Delta R_4/R_1$: resistance reduction at 14 kV measure voltage compared with resistance at a voltage not greater than 500 V.

Table 1

Composition and Properties of various glasses for fused mixtures

| Ser. No. | $SiO_2$ | $B_2O_3$ | $Li_2O$ | $Na_2O$ | PbO | CaO | BaO | $Al_2O_3$ | $\gamma$ (g/cm³) | TEC $10^{-6}$ (°C$^{-1}$) | $t_g$ (°C) | $t_s$(75%) (°C) |
|---|---|---|---|---|---|---|---|---|---|---|---|---|
| 1 | 61 | 29 | | 8 | | 2.4 | | 1 | 2.27 | 5.0 | 505 | 950 |
| 2 | 52.3 | 36.7 | | 8.5 | | 2.4 | | | 2.24 | 5.1 | 500 | 800 |
| 3 | 54.5 | 29.9 | | 4.3 | | | 11.3 | | 2.23 | 4.9 | 535 | 900 |
| 4 | 52.8 | 36.9 | | | | 7.1 | 3.8 | | 2.22 | 4.2 | 600 | 1000 |
| 5 | 56.3 | 22.6 | | | | 5.5 | 5.0 | 10.6 | 2.31 | 4.0 | 635 | 1100 |
| 6 | 55.5 | 38.9 | 5.6 | | | | | | 2.17 | 5.0 | 500 | 850 |
| 7 | 57.5 | 36.7 | 5.8 | | | | | | 2.23 | 4.5 | 495 | 860 |
| 8 | 53.8 | 40.9 | 5.3 | | | | | | 2.13 | 5.5 | 490 | 860 |
| 9 | 54.9 | 38.5 | 4.1 | | | 2.5 | | | 2.19 | 4.4 | 515 | 935 |
| 10 | 54.4 | 38.2 | 3.2 | | | 4.1 | | | 2.23 | 4.4 | 520 | 960 |
| 11 | 52.1 | 37.3 | 3.7 | 0.1 | | 6.9 | | | 2.25 | 4.8 | 545 | 950 |
| 12 | 50.9 | 38.1 | 3.4 | 0.7 | | 6.9 | | 0.5 | 2.28 | 4.6 | 545 | 940 |
| 13 | 53.7 | 37.8 | 2.0 | 4.0 | | 2.5 | | | 2.22 | 4.5 | 500 | 860 |
| 14 | 41.3 | 44.7 | 2.4 | 0.1 | 3.7 | 6.1 | | 1.0 | 2.26 | 4.1 | 520 | 935 |

$\gamma$ = specific gravity of the glass
TEC = Thermal expansion coefficient
$t_g$ = transformation temperature of the glass
$t_s$ = softening to 75% of original height, measured on a cylindrical body in a heating microscope.

Table 2

Influence of Glass Composition on characteristic properties of fused resistance compositions

| Cation of Borosilicate glass | Ser. No. of Table 1 example | Necessary $Na_2O+K_2O$ (% wt.) | fusion temp.$t_f$(°C) | $\Delta R_1/R_o$ (%) | $\Delta R_2/R_1$ (%) | $\Delta R_3/R_1$ (%) | $\Delta R_4/R_1$ (%) |
|---|---|---|---|---|---|---|---|
| Na | 1 | 8.8 | 820 | −20 to −50 | ≥+40 | ≥+1000 (≥150 after 100 hr.) | −60 to −70 |
| Na/Ca | 2 | 8.75 | 810 | −15 to −30 | ≥+10 | +150 to +1500 | −65 to −70 occ'l. breakdown |
| Ba/Na | 3 | 4.3 | 875 | −25 to −40 | ≥+25 | +150 to 600 after 150 hr. | −50 to −60 |
| Ba/Ca | 4 | ≤0.5 | 950 | −5 to −15 | ≥+10 | +100 to +500 | |
| Ba/Ca/Al | 5 | ≤0.5 | 950 | −25 to −40 | +5 to +20 | +20 | −50 to −60 |
| Li | 6,7,8 | ≤0.5 | 830 | −5 to −15 | 0 to −10 | +20 to +100 | −40 to −50 |
| Li/Ca | 9,10,11 | ≤0.5 | 830 | 0 to +10 | −5 to −10 | −20 | −25 to −40 |
| Li/Ca/Na | 12 | 0.7 | 830 | ~0 | ~0 | −20 | −30 to −50 |
| Li/Ca/Na | 13 | 4.0 | 810 | −15 to −30 | ≥+10 | +50 to +200 | −50 to −60 occ'l. brkdwn. |
| Li/Ca/Pb | 14 | ≤0.5 | 810 | −40 to −45 | +20 to +30 | −15 | −50 to −60 occ'l. brkdwn. |

All measurements were made at room temperature. A glass is the better suited for use in composition resistors the nearer the relative change values given in the last four columns of Table 2 approach zero. It is practically impossible to obtain glass in which no change at all of the resistance appears. It is in general more favorable if the changes, as given in the table, are in the negative region, that is, if the resistance after stress is somewhat smaller than before.

From Table 2 it can be clearly seen that the first group of glass types, Examples 1, 2 and 3 of Table 1, have excessively high resistance changes throughout. These are the glasses with a high sodium or potassium content. Glasses 4 and 5, barium borosilicate glasses with a low sodium content show relative resistance changes that are still usable for application in composition resistors, but in this case the necessary fusion temperature, 950°C, is too high. The lithium-containing glasses with a maximum sodium oxide content of 0.7% wt. (Examples 6 through 12) have an 830°C fusion temperature, while the relative change in resistance value of their composition resistance stays within relatively small limits, so that this group of glasses is well suited for service as a component in composition resistors. Glass No. 13 again shows the typical weakness of glasses with high sodium content, namely the sharp change of resistance under prolonged spark service. Glass No. 14, which contains 3.7% by wt. of lead oxide and has a fusion temperature of only 810°C, has a certain limited utility even though the obtainable properties are somewhat less favorable in comparison with glasses 6 through 12.

Table 2 thus very clearly shows that lithium borosilicate glasses and lithium calcium borosilicate glasses produce fused resistor compositions subject only slightly to resistance changes under various kinds of stress provided that the aggregate sodium oxide and potassium oxide of the glass is kept small enough.

With regard to glasses 9, 10 and 11, and particularly glass 11, the relatively high transformation temperatures are to be considered along with the favorable electrical properties. The transformation temperature should, as already mentioned, lie as high as possible in order to prevent changes during operation on account of the effects of high temperature.

The influence of sodium extends, as can be seen from the example of glass 13, not only to the effect of prolonged spark service as already mentioned, but also to voltage breakdown properties. As shown in the last column of Table 2, even irreversible resistance changes caused by high voltage spark discharges take place.

When the sodium oxide content is small, as in Example 12 where it is 0.7% wt. (reference being of course to the combined $Na_2O$ and $K_2O$ content), resistance changes upon initial spark stressing after fusion and also after prolonged thermal stress at 350°C can indeed be reduced, but at the same time a somewhat greater voltage dependence of the resistance and hence a reduced interference suppression effect must be accepted for this composition.

The procedure for manufacturing composition resistors and, particularly, preparing the composition material for the resistors, will now be described.

Carbon black, particularly the variety known as thermal black or decomposition black, formed by the decomposition of hydrocarbons, is used as the resistance material. It is helpful to mix the carbon black with a portion of the other components of the composition in a grinder, because only from 0.3 to 2.5% by wt. of the composition is carbon black for the desired resistance range between about 1 and about 20 $k\Omega$ and preferably the narrower range of 3 to 9 $k\Omega$. In the premixing step the material mixed with the carbon black constitutes about 20 to 35% by wt. of the material of the composition. It has been found advantageous to introduce in the pregrinding stage an inorganic filler having a athermal expansion coefficient higher than that given for the glasses of Table 1. Zirconium dioxide, which has a thermal expansion coefficient (TEC) of about $9.10^{-6}$/°C, is preferred for use as such a filler. This filler serves very well to adjust the average thermal expansion coefficient of the composition resistor to that of the surrounding ceramic in a spark plug, so that a hermetically sealed fused insert can be made. It is important, moreover, to include in the preground mixture a portion of the glass to be used in the composition, at least 2% by wt. of the glass intended to be used in the composition. This is because the finely ground glass constituent thus provided is necessary in the fused composition, because otherwise the electrical breakdown characteristic of the composition resistor can be unsatisfactorily low. The finely ground portion of the glass evidently prevents pores and cracks from persisting in too great quantity during the fusion of the composition resistor.

The preground component material thus obtained, consisting of carbon black, filler and the fine portion of the glass is then applied to the remaining coarse fraction of the glass constituent of the ultimate product, with the help of an organic binder. This is done in a stirring and mixing procedure. The material thus obtained, the individual grains of which now consist of a glass core with a shell or coating of carbon black, filler and fine glass, is dried as soon as it is produced. The more closely the grain size of the coarse glass is controlled, the smaller the tolerances of the resistance value of the composition resistor can be. It has been found advantageous to use a particle size of from 0.2 to 0.4 mm. The finer grain glass fraction produced in the preparation of the coarse fraction of the desired grain size can be used in the pregrinding step.

The organic binders used in the above described process are preferably the well known water soluble binders such as dextrin, methyl cellulose and polyvinyl alcohol or aqueous emulsions such as, for example, emulsions of waxes or of polyvinyl acetate. The kind and the quantity of the binder have practically no effect on either the resistance value after fusion or on resistance changes of the resistor composition under the various kinds of operating stress.

As a variation from the so-called "PANAT" process, which is the process just above described, it is also possible to prepare first a pasty mass from all the raw materials, after they have been at least partially subjected to a common grinding process, by stirring into the materials so ground a solution or emulsion of an organic binder of a kind above named. This mass, after some drying if necessary, is then made into a free-flowing granular material which can readily be measured out in doses by volume, by treatment in a granulator, for example in a screen granulator.

A specific example will now be given of a composition resistor in accordance with the invention.

Composition of the pregrinding mix:

| | |
|---|---|
| Thermal carbon black (7 m²/g) | 3.7% by wt. |
| Glass 11 (see Table 1) 0.1 mm | 15.3% by wt. |
| Zirconium dioxide (4.8 m²/g) | 81.0% by wt. |

Note: The percentages by weight as given above refer only to the pregrinding mix Grinding conditions: 30 minutes in a ball mill with corundum grinding balls of 12 mm diameter.

Composition of the complete mixture:

| | |
|---|---|
| Glass 11 (see Table 1) 0.2 to 0.4 mm | 68.2% by wt. |
| Carbon black/glass/ZrO₂ preground mix | 25.9% by wt. |
| Wax emulsion with 45% fatty matter | 5.9% by wt. |

The manufacture of a built-in resistor in a spark plug will now be described with reference to the single FIGURE of the annexed drawing, which is a sectional view of a partly broken away spark plug.

As shown in the drawing, the spark plug comprises an insulator 2 surrounded in a gas tight fashion by a plug casing 1. The insulator has an axial bore 3 in which are held the two pieces of the central electrode, an outer piece 4 on the contact side and an inner piece 5 on the spark side. The two central electrode pieces 4 and 5 are joined in electrically conducting connection with a composition resistor 8 embodying the present invention by means of two low resistance contact inserts 6 and 7 made of an electrically conducting sealing material. The grounded electrode of the spark plug is designated 9.

The manufacturing operation involved in making the spark plug, so far as it relates to the filling of the central bore 3 of the insulator 2 is as follows:

The lower portion 5 of the central electrode is inserted into the bore 3 of the insulator 2, while the insulator is vertically inserted in the cavity of a thermally stabilizing massive metal plate, since at this stage the insulator is not yet ready to be put into the spark plug casing 1. As soon as the electrode portion 5 is in place, a quantity of a low resistance electrically conducting sealing material, measured out by volume, which forms the lower contact insert 7, is poured into the central bore 3 over the head of the lower central electrode portion 5 and then compressed with a plunger. For the electrically conducting sealing material it is advantageous to use a mixture of carbon black and glass previously selected to use the same glass component as is used in the composition resistor. The sealing material contains in addition some graphite in order to match the thermal expansion coefficient of the ceramic and of the composition resistor, as well as a small portion of aluminum powder for suppression of a resistance increase during prolonged stress in ignition spark service.

A suitable ssealing material for use as a contact insert as above described has the following composition:

| | |
|---|---|
| Glass 11 (Table 1); 0.06 to 0.03 mm grains | 61.0% by wt. |
| Carbon black | 14.0% by wt. |
| Graphite | 11.8% by wt. |
| Aluminum powder | 0.9% by wt. |
| Dextrin, 35% aqueous solution | 1.3% by wt. |
| Methylcellulose, 3% aqueous solution | 11.0% by wt. |

A volume gauged quantity of the resistor material is then poured on top of the contact insert 7. The resistor material is for example the material the preparation of which has already been described above. It too is compresed in place with a plunger.

On top of the resistor material thus precompressed, another volume gauged quantity of sealing material such as that above described is inserted into the insulator bore to serve as the contact insert 6. This material is either precompressed with a plunger or directly pressed into place by the insertion of the upper portion 4 of the central electrode which provides the connection side of the electrode.

The insulator thus equipped is then passed through a continuous feed oven while held in its thermally stabilizing metal plate and the oven is operated so that the insulator and its contents is held at the maximum fusion temperature to be applied to the resistor composition, which is, in this case, about 830°C, for about 5 to 10 minutes.

Upon leaving the oven, the insulator is quickly placed under a compression plunger and the upper electrode portion 4 is pressed while still warm into the viscous sealing material. Care must be taken at this stage to be sure that the sealing material is not too fluid, for otherwise the compression of the resistor composition will be insufficient and its electrical breakdown properties will be impaired and the voltage dependence of its resistance will be increased. The necessary force for compression in the warm state is somewhere around 40 kilopounds. The compression force must be maintained until the fused inserts 6, 7 and 8 have cooled below the transformation temperature of the glass material. A cooling period of 30 to 60 seconds can be sufficient for this purpose, particularly if a cool air blower is used. The complete fused insert is then tested to determine its resistance value and its gas-tight condition.

The contact inserts 6 and 7 of low resistance electrically conducting sealing material serve to avoid the creation of contact resistances between the electrode portions 4 and 5 and the composition resistor 8, which could arise by insufficient engagement of the composition resistor and the electrode portions. The use of the same kind of glass for the contact inserts 6 and 7 on one hand and for the composition resistor on the other has the advantage that interfering reactions between different kinds of glass cannot arise which might reduce the integrity of the composite fused insert with respect to electrical discharge breakdown and increase the dependence of the resistance on the applied voltage. In addition, possibility of using the same kind of glass for both purposes leads to savings in investment for glass preparation installations.

The invention provides a composition resistor particularly suitable for spark plugs which can be fused at the relatively low temperatures in the range of 820° to 850°C without causing or allowing the resistor to change its resistance substantially after prolonged spark discharge and temperature stresses and also without the development of an excessive dependence of the resistance upon the applied voltage, so that even after long periods of operation there is good suppression of radio interference. It is moreover possible to combine the composition resistor with low resistance contact wafers of a composition based on the same glass component, thus preventing the appearance of difficulties to be expected from the combination of different types of glass and providing economies in investment in facilities for manufacturing the fused inserts.

We claim:

1. A composition resistor suitable for incorporation in a spark plug consisting of a fused mixture consisting essentially of carbon black in a proportion between 0.3 and 2.5% by weight, a borosilicate glass, an inorganic filler and an organic binder, the borosilicate glass constituting the major portion of the composition and the filler being metal oxide having a thermal expansion coefficient in excess of 5.5 parts per million per °C and being present in a quantity approximating the amount thereof required to raise the average thermal expansion coefficient to a value within the TEC range common to ceramic materials, and the organic binder being present in a proportion of the order of magnitude of 6% by weight, in which, further, said glass consists essentially of between 35 and 65% by weight of silicon dioxide, between 20 and 55% by weight of boric oxide, between 0.5 and 10% by weight of lithium oxide, having an aggregate sodium oxide and potassium oxide content, if any, not exceeding 2% by weight, with or without one or more of the following constituents in the following ranges of percentage by weight:

| Constituent | % by weight |
|---|---|
| CaO | 0.15% |
| SrO | 0.15% |
| BaO | 0.10% |
| MgO | 0.15% |
| $Al_2O_3$ | 0.15% |
| PbO | 0.5% |

2. A composition resistor as defined in claim 1 in which the silicon dioxide content of said glass is between 45 and 60% by weight, the boric oxide content of said said glass is between 30 and 45% by weight, the lithium oxide content of said glass is between 2.5 and 7% by weight, the calcium oxide content of said glass is between 2 and 10% by weight, the aggregate content of sodium oxide and potassium oxide of said glass does not exceed 1% by weight, the calcium oxide, strontium oxide, barium oxide, magnesium oxide and lead oxide contents of said glass are each not in excess of 0.5% by weight and the aluminum oxide content of said glass does not exceed 1% by weight.

3. A composition resistor as defined in claim 1 in which the inorganic filler material consists essentially of zirconium oxide and constitutes about one-fifth of the resistor composition by weight.

4. A method of manufacturing a composition resistor suitable for incorporation in a spark plug from materials consisting essentially of carbon black in a proportion between 0.3 and 2.5% by weight, a lithium or lithium-alkaline-earth borosilicate glass in which the aggregate content of sodium oxide and potassium oxide does not exceed 2% by weight of the glass, said glass constituting the major portion of the composition, a metal oxide filler having a thermal expansion coefficient in excess of 5.5 parts per million per °C present in a quantity approximating the amount thereof required to raise the average thermal expansion coefficient of the mixture to a value within the TEC range common to ceramic materials, and an organic binder constituting approximately 6% by weight of the materials, said method comprising the steps of:

pre-grinding the entire carbon black component of the composition, with a portion amounting to from between 20 and 35% of the remaining portion of the aforesaid materials not including, however, any of the organic binder, including at least 2% by weight of the total amount of glass to be used, wetting the portion of the glass not pre-ground in the previous step with an aqueous solution or emulsion of the organic binder said binder being selected from the group consisting of dextrin, methyl cellulose, polyvinyl alcohol, polyvinyl acetate and wax and mixtures of at least two of the foregoing, and mixing and stirring the pre-ground mixture with the rest of the aforesaid materials including the glass wetted as aforesaid; and filling molds or containers for resistors with the resulting material and fusing the contents by heat.

5. A method of preparing material for the manufacture of composition resistors suitable for use in spark plugs from starting materials consisting essentially of carbon black in a proportion between 0.3 and 2.5% by weight, a lithium or lithium-alkaline-earth borosilicate glass in which the aggregate content of sodium oxide and potassium oxide does not exceed 2% by weight of the glass, said glass constituting the major portion of the composition, a metal oxide filler having a thermal expansion coefficient in excess of 5.5 parts per million per °C present in a quantity approximating the amount thereof required to raise the average thermal expansion coefficient of the mixture to a value within the TEC range common to ceramic materials, and an organic binder constituting approximately 6% by weight of the materials, said method consisting essentially of the steps of:

grinding together all of the carbon black and between 20 and 35% of the other starting materials except the organic binder;

mixing a water dispersion of the binder, said binder being a material selected from the group consisting of dextrin, methyl cellulose, polyvinyl alcohol, polyvinyl acetate and wax and mixtures of at least two of the foregoing, to form a pasty mass;

drying the resulting material and granulating it in a granulator to form pourable granules of material.

* * * * *